United States Patent [19]

Millner et al.

[11] 3,838,486

[45] Oct. 1, 1974

[54] METHOD FOR THE PREPARATION OF TUNGSTEN INCANDESCENT BODY CONTAINING FOREIGN SUBSTANCES

[75] Inventors: Tivadar Millner; Laszlo Bartha; Jeno Neugebauer, all of Budapest, Hungary

[73] Assignee: Egyesult Izzolampa es Villamossagi Reszvenytarsasag, Budapest, Hungary

[22] Filed: Aug. 23, 1973

[21] Appl. No.: 390,944

Related U.S. Application Data

[62] Division of Ser. No. 266,578, June 27, 1972.

[30] Foreign Application Priority Data

Mar. 16, 1972 Hungary ............................ MA 2339

[52] U.S. Cl.................. 29/420.5, 29/182, 29/182.5, 75/176, 75/207
[51] Int. Cl............................................... B22f 3/24
[58] Field of Search ....... 29/182, 182.5, 420, 420.5, 29/DIG. 31; 75/176, 207; 252/515

[56] References Cited
UNITED STATES PATENTS

| | | | |
|---|---|---|---|
| 1,602,526 | 10/1926 | Gero | 75/207 X |
| 2,948,609 | 8/1960 | Millner et al. | 75/207 X |
| 3,351,438 | 11/1967 | Millner et al. | 29/182 |
| 3,475,159 | 10/1969 | Hansen et al. | 75/207 X |
| 3,661,536 | 5/1972 | Shimizu et al. | 29/182 |
| 3,798,008 | 3/1974 | Baktai et al. | 29/182 |

FOREIGN PATENTS OR APPLICATIONS

| | | | |
|---|---|---|---|
| 258,642 | 9/1926 | Great Britain | 75/207 |
| 427,757 | 4/1935 | Great Britain | 75/207 |

Primary Examiner—C. W. Lanham
Assistant Examiner—D. C. Reiley, III
Attorney, Agent, or Firm—Young & Thompson

[57] ABSTRACT

A method for providing a tungsten incandescent body containing silicon-free foreign materials, which is in a recrystallized state and has high strength at room temperature, one of the foreign materials being beryllium present in about 0.01–100 ppm and a method of producing the body is provided in which a silicon-free beryllium compound is added in a proportion of 100–10,000 ppm calculated as beryllium oxide to tungsten oxide.

3 Claims, No Drawings

METHOD FOR THE PREPARATION OF TUNGSTEN INCANDESCENT BODY CONTAINING FOREIGN SUBSTANCES

This is a division of application Ser. No. 266,578, filed June 27, 1972.

The invention relates to a method for providing a tungsten incandescent body containing foreign substances, which is in a recrystallized state, and has high strength at room temperature.

It is known that illuminating tungsten filament incandescent lamps, such as gas-filled double-coil lamps, halogen-containing incandescent lamps, etc., should be prepared economically out of such tungsten wires from which incandescent bodies which retain their shape at operating temperature, that is are not elongated, and which are not brittle at ordinary temperatures, may be prepared.

Tungsten wire characteristics corresponding to the requirements of incandescent lamp production are today generally attained by the addition of not more than all together one per cent of an additive material composed of compounds containing K, Si and Al to the base material of the tungsten wire: the $WO_3$, or the blue oxide (e.g. $WO_{2.9}$); the thus achieved so called doped base material is then reduced to doped tungsten metal powder by heating it in a stream of hydrogen. In one form of practice the majority of the said additive material is thereafter removed from such metal powders by washing them out and porous bars are pressed from it. In another practical technique the porous bars are pressed from the doped metal powder without washing it out.

For the purposes of sintering, in both cases the pressed bars are heated up almost to the melting point. This heating up is achieved by the passage of an electrical current directly through the bars. In the course of this sintering (compacting) in a protective atmosphere of hydrogen additive materials evaporate out of the bars. The bars prepared by the two practical techniques mentioned are sintered to different extents, but in such a way that both methods lead to the formation of sintered rods which can be swaged and drawn into wire, and in which very small amounts of foreign materials remain in addition to the tungsten, e.g. foreign materials containing 10–50 ppm K, 1–3 ppm Si and 1–2 ppm Al calculated on the tungsten.

These foreign materials containing a few ppm of K, Si and Al are responsible for the useful incandescent filament and incandescent body properties: the recrystallization occurring at high temperature and leading to long crystals in the wire, the retention of shape at high temperature and the not completely satisfactory strength at room temperature.

In the following the term "additives" is applied to those chemical materials which contain (foreign) atom species different from tungsten and which are added to the starting material for the preparation of the tungsten wire. The residual traces of these which are present in the prepared tungsten wire are termed "foreign materials," even when they contain foreign atoms themselves different from tungsten, and when these consist of a chemical compound or compounds of the foreign atom species different from tungsten.

On the other hand traces of substances or residues of these being present as non-additives but natural impurities, are hereafter called "impurities."

The aim of the present invention was to improve the strength of tungsten wires in their recrystallized state at normal (room) temperatures. It was found that this aim can be achieved by modifying the foreign materials hitherto used in tungsten.

As regards the chemical-physical natures of the foreign materials and the mode of their action, different findings and opinions have been presented in the international technical literature.

According to the findings and views associated with the name of RIECK (1), the foreign materials form solid-phase molecules in the tungsten metal, and give rise to the favourable recrystallization properties, etc., by being situated initially on the surface of the fibres of the drawn tungsten wires. It is considered possible tht the composition of the molecules is $KAlSi_2O_6$, that is it corresponds to the composition of the mineral leucite.

According to the findings associated with the name of WALTER (2), the foreign materials similarly form solid-phase molecules, and give rise to the recrystallization and other favourable properties by finally being dispersed throughout the tungsten metal. According to these findings, the molecules have diameters of about 400 A, while their composition is $3Al_2O_3 \cdot 2SiO_2$, approximately the same as that of the mineral mullite.

According to more recent observations, a network of spherical micropores can be found in recrystallized tungsten metal doped with foreign materials containing K, Si and Al; and according to the most recent observations these pores contain elemental potassium. According to present-day views, the network of micropores may give rise to the recrystallization and other favourable properties in tungsten metal doped with foreign materials containing K, Si and Al in just the same way as the above-mentioned network of foreign-phase molecules. The diameters of the spherical micropores are about 100 A.

We do not question the participation of the molecules and bubbles in the formation of the effect of the additive traces, but MILLNER, NEUGEBAUER and KERENYI have already proved that the $Al_2O_3$ in the trio of additives containing K, Si and Al can be replaced by $Ga_2C_3$ which is reduced to Ga in hydrogen (3), and the $K_2O$ can be replaced by $Tl_2O$ which is reduced to Tl in hydrogen (4), without impairing the good recrystallization and other properties. This supports the idea that the effect of the foreign materials and additives containing K, Si and Al is by no means based only on the effect of the foreign-phase molecules: a dominant or equivalent role in this effect may also be played by K and Al atoms too, for example.

In addition to this, as long ago as 1931 MILLNER and TURY (5) described that the foreign materials can exert a considerable vapour pressure in the bars during sintering and in the wire during recrystallization; this vapour pressure produces an internal stress state in the metal body and hence leads to the formation of large crystals. The more recent theory of the network of spherical micropores is in agreement with this suggestion and demonstrates the role of the K atoms from among the foreign materials.

When our knowledge of the mode of action of the foreign materials was thus enlarged, but a complete agreement could still not be attained, we considered the question of whether the $SiO_2$ in the trio of additives containing K, Si and Al could also be replaced by some analogous oxide which can be reduced with hydrogen without impairing the good properties of the metal. These studies, which extended to $GeO_2$ among others, have so far not led to a result.

This directed our attention to the fact that while, as we have seen, the good effect is exerted by Tl atoms instead of $K_2O$ in the trio of additives containing K, Si and Al, and the same is done by Ga atoms instead of $Al_2O_3$, in the case of $SiO_2$ it may be possible that it is not Si or analogous atoms which are responsible for the effects, but rather some characterstic silicon-oxygen bonding. This means that as regards the $SiO_2$ additive we should not look for a substitute with an analogous favourable effect among the atoms similar to Si, but should try to find it among those atoms which behave similary to Si in their bonding to oxygen.

Geochemical and mineralogical considerations led us to the fact that in nature (in the mineral world) Be atoms for example behave similarly towards oxygen as do Si atoms. The bonding of Si atoms to oxygen is characterized by the fact that in minerals Si is coordinated to oxygen practically without exception in tetrahedra, and thus $SiO_4$ tetrahedra are present. Be atoms in minerals behave exactly similary: in almost all Be-containing minerals $BeO_4$ tetrahedra occur.

It is considered favourable that the radius of the $Be^{2+}$ ion, 0.34 A, is even smaller than that of the $Si^{4+}$ ion, 0.39 A, and that the strength of the Be-O bond, ca. 75Kcal/mole, is much higher that that of the Si-O bond, ca. 51 Kcal/mole. A tungsten metal powder was therefore prepared by the addition of an aqueous solution of $KCl$, $BeCl_2$, and $Al_2Cl_6$ to the $WO_3$ base material, with the aim of examining whether, by replacing the $SiO_2$ with BeO which is even more difficult to reduce with hydrogen, the large-crystalline structure would remain and other properties better than those already known would appear.

The additive-containing aqueous paste was dried, the doped $WO_3$ was reduced with hydrogen, a bar was pressed from the metal powder formed, and this was then sintered by the passage of an electric current. The sintered bar was worked into incandescent lamp wires by swaging and wire-drawing. It was observed that the recrytallization, form-retaining, strength and other useful properties of the wires so prepared containing K, Be and Al foreign materials, that is the beryllium tungsten wires prepared in accordance with the inventions in practice did not fall behind the corresponding properties of the known wires containing K, Si and Al foreign materials, while in addition their strength in the recrystallied state was substantially better at normal (room) temperatures than that of the doped wires containing K, Si and Al foreign materials. In our opinion, the reason for this is to be found in the fact that the -W-O-Be-O-W-bonding of the crystallite boundaries is stronger than the -W-O-Si-O-W-bonding.

It must be mentioned that the favourable effects of the foreign materials and additives containing beryllium were found by experience, and the assertion of the effects does not depend on the validity of the explanations attributed to them.

The tungsten wires prepared according to the invention, and thus tungsten wires prepared with additive materials containing K, Be, Al or Tl, Be, Ga or K, Be or K, Be, Al, Ga etc., for example, do not contain considerable amounts (either as impurities or as foreign materials) of Si or compounds containing Si, but do contain, and precisely instead of it, foreign material containing Be; in this way the wires differ primarily from the tungsten wires prepared with the foreign materials $Be_2SiO_4$ or $BeSiO_3$ according to the British patent No. 258,642 published in 1926 (6). According to the description in this British Patent No. 258,642, as a result of the beryllium silicate foreign materials these wires are free of the off-set phenomenon which can occur at the temperature of the incandescent filament. It is generally known that this detrimental phenomenon occurs when those crystallites of the recrystallized tungsten wires which are in contact with the boundaries largely normal to the axis of the wire gradually slip on each other on these boundaries, whereby the conductor cross-section decreases locally and hence the incandescent filament burns out prematurely (7). The off-set phenomenon was a characteristic fault of tungsten wires prepared according to the old practice and containing much impurity, e.g. much calcium oxide, etc. Nowhere in the description in the British Patent No. 258,642 is it asserted that the recrystallized beryllium silicate tungsten wires are not brittle at ordinary temperatures or that they are significantly stronger than for example the so-called pure, that is additive-free, tungsten wires.

Our invention does not extend to the use of beryllium silicate as an additive or a foreign material, because experience showed that the strength-increasing effect of BeO observed by using completely marred by the necessary $SiO_2$ content, presumably for the very reason that it leads to the formation of beryllium silicates, when the Be is bound by the favourable oxygen bonds mentioned above, however, not towards the W atoms, but towards the Si atoms.

It was observed during our experiments that in order to attain the favourable effect of the beryllium-containing foreign materials it was necessary for the beryllium content of the tungsten wire according to the invention to be at least 0.000001 percent, that is 0.01 ppm; It was also observed that to avoid the disturbing effect of silicon-containing foreign material or impurity traces and thus for the necessary attainment of the favourable effect of the beryllium-containing silicon-free additive, it was sufficient if the silicon content of the tungsten wires according to the invention was less than half the beryllium content so as to ensure a considerable beryllium content being independent from the Si content.

Our invention is thus a foreign material-containing tungsten incandescent body, which is in a recrystallized state, has high strength at room temperature. and is characterized by the facts that one of the foreign materials contains beryllium, that the beryllium content of the tungsten incandescent body is 0.01 – 100 ppm, and that the silicon content (impurity) is less than half the beryllium content.

The procedure for the preparation of the tungsten incandescent body according to the invention is characterized by the fact that a silicon-free beryllium compound is added as one of the additives, in a proportion of 100 – 10,000 ppm calculated as beryllium oxide, to a tungsten oxide the silicon dioxide impurity of which does not exceed thhe amount corresponding to the atomic ratio one silicon to six berylliums, and tungsten oxide is itself then reduced to metal powder, pressed, sintered and swaged, and finally formed into wire by wire-drawing and hence into an incandescent body, by known methods.

The preparation of the tungsten incandescent body according to the invention can also be carried out in such a way that the silicon dioxide impurity content is adjusted to less than the amount corresponding to the atomic ratio one silicon to six berylliums by the washing out of the reduced metal powder or the partially sintered metal body, for example by the washing out with a hydrofluoric acid solution by a known method.

According to the composition given for the tungsten incandescent body in accordance with the invention, a maximum of about one-sixth part of the beryllium content in the incandescent body may be bound by the silicon. It follows from the atomic weights of beryllium and silicon that for 90.2 parts by weight of beryllium to form beryllium silicate of composition $BeSiO_3$ in its complete entirety, 280.6 parts by weight of silicon are necessary. Thus, 45.1 parts by weight of silicon, i.e. half of 90.2 parts by weight, bind 45.1/280.6, i.e. approximately one-sixth part of 90.2 parts by weight of the beryllium amount.

By the terms tungsten wire and tungsten incandescent body according to the invention are understood a tungsten wire and a tungsten incandescent body which in addition to the proposed Be-containing foreign materials also contain one or more other foreign materials, such as for example foreign materials containing K and/or Al, or K and or Ga, as well as for example Tl and/or A, or Tl and/or Ga, etc., but does not contain silicon only as an impurity (if it does).

In this respect we have to remark that due to the fact that the foreign materials present in tungsten are partly present in atomic form, partly in some compounds (as added or formed during working of the raw material) further because according to the literature this question is not clarified, we shall speak about foreign materials independently wether they are present in atomic state or in some compound and shall express the amount of the traces of these foreign materials in the reduced tungsten material uniformally always in their atomic state.

We have found that in all the additive material trio combinations so far studied, which also contain $SiO_2$ and give rise to large-crystalline, useful incandescent filament properties in the tungsten wires, such for example in the additive combinations containing K, Si, Ga or K, Si, Al or Tl, Si, Al or Tl, Si, Ga, the foreign material containing the $SiO_2$ can be favourably exchanged for foreign material containing BeO, because by this means among other results the room-temperature strength of the tungsten incandescent bodies is increased significantly, without the appreciable decrease of their other good properties.

To date tungsten wires have been prepared for use as incandescent lamps, which have properties considered as satisfactory as a result of foreign material containing not two, but one or more than two different elements in addition to the $SiO_2$-containing foreign material We have found that in the foreign material combinations studied to date and applied in the preparation of such wires too the foreign material containing $SiO_2$ can be favourably exchanged for the foreign material containing BeO.

Tungsten wires prepared with the combination of two foreign materials containing for example K and Be according to the invention and in their recrystallized state attain the average good properties and the structure consisiting of average sized crystals of known tungsten wires prepared with foreign materials containing K and Si. In addition to this, however, their strength in the recrystallized state at ordinary temperatures is substantially better than such strength of wires prepared with foreign materials containing K and Si.

Tungsten wires prepared with the foreign material quartet combination containing for example K, Be, Al and Ga according to the invention are large-crystalline on recrystallization, and their good properties attain and even exceed the good properties of known tungsten wires prepared with the foreign material trio combination containing K, Si and Al; in addition to this their strength in the recrystallized state at room temperature is substantially better than such strength of known recrystallized tungsten wires prepared with the foreign material trio K, Si and Al.

By the use of foreign materials containing beryllium, tungsten incandescent bodies with many types of favourable properites can be prepared, as is clear from the following reported examples and their accompanying description.

EXAMPLE 1

A 0.3 percent aqueous solution of KCl, an aqueous solution of beryllium chloride corresponding to 0.20 percent BeO, and an aqueous solution of aluminium chloride corresponding to 0.05 percent $Al_2O_3$, calculated with respect to the $WO_3$, are added to a dilute aqueous paste of $WO_3$ powder prepared by heating from ammonium paratungstate (the so-called para-crystals), and then tungsten metal powder is made from this in the normal way, that is by drying and by reduction with hydrogen. Bars are pressed from the metal powder, and these are sintered to make them compact by heating them with an electric current in hydrogen gas. The bars thus prepared contain approximately 0.10–10.0 ppm Be, 1–2 ppm Al and 10–100 ppm K.

EXAMPLE 2

An aqueous solution of thallium/I/nitrate corresponding to 0.1 percent Ti, an aqueous solution of beryllium chloride corresponding to 0.20 percent BeO and an aqueous solution of aluminium chloride corresponding to 0.05 percent $Al_2O_3$, calculated with respect to the $WO_3$, are added to a dilute aqueous paste of "blue oxide" powder of composition $WO_{2.9}$ prepared from para-crystals by heating and mild reduction, and then from this by the method of Example 1 compact, sintered tungsten bars are prepared. Such bars contain approximately 0.10 – 10.0 ppm Be, 1 – 2 ppm Al and 0.1 –10.0 ppm Tl.

EXAMPLE 3

A 0.3 percent aquoeus solution of KCl, an aqueous solution of beryllium nitrate corresponding to 0.20 percent BeO and an aqueous solution of gallium nitrate corresponding to 0.03 percent $Ga_2O_3$, calculated with respect to the $WO_3$, are added to a dilute aqueous paste of "blue oxide" powder of composition $WO_{2.9}$ obtained from para-crystals by heating and mild reduction, and then from this by the method of Example 1 compact, sintered tungsten bars are prepared. Bars so prepared contain approximately 0.10 – 10.0 ppm Be, 0.01 – 5 ppm Ga and 10 – 100 ppm K.

EXAMPLE 4

An aqueous solution of thallium/I/nitrate corresponding to 0.1 percent Tl, an aqueous solution of beryllium nitrate corresponding to 0.20 percent BeO and an aqueous solution of gallium nitrate corresponding to 0.03 percent $Ga_2O_3$, calculated with respect to the $WO_3$, are added to a dilute aqueous paste of $WO_3$ powder prepared from para-crystate by heating, and then from this by the method of Example 1 compact, sintered tungsten bars are prepared. Bars so prepared contain approximately 0.10 – 10.0 ppm Be, 0.01–5 ppm Ga and 0.1–10.0 ppm Tl.

EXAMPLE 5

A 0.3 percent aqueous solution of KCl, an aqueous solution of beryllium nitrate corresponding to 0.02 percent BeO and an aqueous solution of aluminium chloride corresponding to 0.05 percent $Al_2O_3$, calculated with respect to the $WO_3$, are added to a dilute aqueous paste of $WO_3$ powder prepared from para-crystals by heating, and then from this by the procedure of Example 1 compact, sintered tungsten bars are prepared. Bars so prepared contain approximately 0.01 – 1.0 ppm Be, 1–2 ppm Al and 10–100 ppm K.

EXAMPLE 6

An aqueous solution of thallium/I/nitrate corresponding to 0.1 percent Tl, an aqueous solution of beryllium nitrate corresponding to 0.02 percent BeO and an aqueous solution of aluminium chloride corresponding to 0.05 percent $Al_2O_3$, calculated with respect to the $WO_3$, are added to a dilute aqueous paste of $WO_3 \cdot H_2O$ precipitated with boiling hydrochloric acid from a boiling aqueous solution of $Na_2WO_4$, and then from this by the method of Example 1 compact, sintered tungsten bars are prepared. Bars so prepared contain approximately 0.01 – 1.0 ppm Be, 1–2 ppm Al and 0.1 – 1.0 ppm Tl.

EXAMPLE 7

A 0.3 percent aqueous solution of KCl, an aqueous solution of beryllium chloride corresponding to 0.02 percent BeO and an aqueous solution of gallium nitrate corresponding to 0.03 percent $Ga_2O_3$, calculated with respect to the $WO_3$, are added to a dilute aqueous paste of "blue oxide" powder of composition $WO_{2.9}$ prepared from para-crystals by heating and mild reduction, and then from this by the procedure of Example 1 compact, sintered tungsten bars are prepared. Bars so prepared contain approximately 0.01 – 1.0 ppm Be, 0.01–5 ppm Ga and 10 – 50 ppm K.

EXAMPLE 8

An aqueous solution of thallium/I/nitrate corresponding to 0.1 percent Tl, an aqueous solution of beryllium nitrate corresponding to 0.02 percent BeO and an aqueous solution of gallium nitrate corresponding to 0.03 percent $Ga_2O_3$, calculated with respect to the $WO_3$, are added to a dilute aqueous paste of $WO_3 \cdot H_2O$ precipitated with boiling hydrochloric acid from a boiling aqueous solution of $Na_2WO_4$, and then from this by the method of Example 1 compact, sintered tungsten bars are prepared. Bars so prepared contain approximately 0.01 – 1.0 ppm Be, 0.01 – 1.0 ppm Ga and 0.1 – 1.0 ppm Tl.

EXAMPLE 9

A 0.3 percent aqueous solution of KCl, an aqueous solution of $BeCl_2$ corresponding to 0.02 percent BeO, an aqueous solution of $Al_2Cl_6$ corresponding to 0.03 percent $Al_2O_3$ and an aqueous solution of gallium nitrate corresponding to 0.03 percent $Ga_2O_3$, calculated with respect to the $WO_3$, are added to a dilute aqueous paste of "blue oxide" powder of composition $WO_{2.9}$ prepared from para-crystals by heating and mild reduction, and then from this by the procedure of Example 1 compact, sintered tungsten bars are prepared. Bars so prepared contain approximately 0.01 – 1.0 ppm beryllium, 0.5–1.0 ppm aluminium, 0.01 – 5.0 ppm gallium and 10–50 ppm potassium.

Beryllium tungsten bars prepared according to Examples 1 to 8 and 9 are swaged and worked into drawn wire, and from this coil-shaped incandescent bodies with a wire diameter of 0.3 mm for example, and also 220 V/40 W double coils with a wire diameter of 0.014 mm are prepared; it is observed that in these on recrystallization a structure develops which consists of crystals much longer than the wire diameter. The other properties of such beryllium tungsten incandescent bodies in general attain the good properties of silicon tungsten incandescent bodies prepared with foreign materials containing K, Si and Al. The room-temperature strength of the recrystallized beryllium tungsten incandescent bodies, however, far exceeds those of recrystallized silicon tungsten incandescent bodies: while 220 V/40 W recrystallized double coils prepared with foreign materials containing K, Si and Al can be drawn out to about twice their original length at room temperature without breaking, the beryllium tungsten recrystallized 220 V/40 W double coils can be drawn out on average to three-four times their original length.

Incandescent bodies, for example 220 V/40 W double coils, can be prepared from the beryllium tungsten bars made with foreign material containing Tl, but without foreign material containing K, as in Examples 3, 4, 6 and 8, such that they do not burn out by arcing in gas-filled incandescent lamps among others corresponding to the description in the Hungarian Patent No. 155,352 (4), not even if they are connected in the first instance directly at the maximum incandescent filament temperature, which causes burn out by arcing almost without exception in the case of incandescent filaments prepared with foreign materials containing K, Si, and Al. Foreign material containing Be does not mar the favourable effect of foreign material containing Tl.

Incandescent bodies, for example 220 V/40 W double coils can be prepared from the beryllium tungsten bars made with foreign material containing Ga, but without foreign material containing Al, as in examples 3, 4, 7 and 8, such that among others in accordance with the description in the Hungarian Patent No. 152,086 they retain their shape better (they are less flexible) at the incandescent filament temperature than the double coils prepared with foreigh materials containing K, Si and Al. Foreign material containing Be does not mar the favourable effect of foreign material containing Ga.

The wires of beryllium tungsten bars prepared according to Examples 6 and 8 are particularly suitable for incandescent bodies of incandescent lamps containing halogen, in which in addition to a crystal structure ensuring retention of shape it is also desirable (in order to ensure the non-disturbance of the gas-space processes) to maintain the possibly evaporating foreign material content of the incandescent filaments at an extremely low level.

REFERENCES

1. RIECK, G.D.: High Temperature — High Pressures; 2, 149 (1970).
2. WALTER, J.L.: Trans. Met. Soc. AIME, 239, 272 (1967).
3. MILLNER, T., NEUGEBAUER, J. and KERENYI, L.: Hungarian Patent Specification No. 152,086 (1963)
4. MILLNER, T. and NEUGEBAUER, J.: Hungarian Patent Specification No. 155,352 (1966).
5. MILLNER, T. and TURY, P.: Hungarian Patent Specification No. 106,268 (1931).
6. THE EDISON SWAN ELECTRIC COMPANY, Ltd., and PERCIVAL, G.A.: British Patent Specification No. 258,642 (1926).
7. SMITHELLS, G.J.: Tungsten, p. 91 (1926).

What we claim is:

1. A method of producing tungsten incandescent bodies, comprising adding a silicon-free beryllium compound in a proportion of 100 – 10,000 ppm calculated as beryllium oxide, to a tungsten oxide, maintaining any silica impurity of the tungsten oxide to an atomic ratio not greater than one silicon to six beryllium, reducing the tungsten oxide to a metal powder, and pressing, sintering, swaging and drawing to a wire and forming the reduced metal powder to an incandescent body.

2. A method of producing tungsten incandescent bodies, comprising adding a silicon-free beryllium compound in a proportion of 100 – 10,000 ppm calculated as beryllium oxide, to a tungsten oxide, reducing the tungsten oxide to a metal powder, washing out the reduced metal powder thereby to maintain the silica impurity of the tungsten oxide to an atomic ratio not greater than one silicon to six beryllium to one silicon, and pressing, sintering, swaging and drawing to a wire and forming the reduced metal powder to an incandescent body.

3. A method of producing tungsten incandescent bodies, comprising adding a silicon-free beryllium compound in a proportion of 100 – 10,000 ppm calculated as beryllium oxide, to a tungsten oxide, reducing the tungsten oxide to a metal powder, pressing and presintering the reduced metal powder to a porous bar, lowering the silica impurity of the tungsten oxide to an atomic ratio not greater than one silicon to six beryllium, and then sintering, swaging and drawing to a wire and forming the reduced metal to an incandescent body.

* * * * *